(12) United States Patent
Louwerse

(10) Patent No.: US 9,786,195 B2
(45) Date of Patent: Oct. 10, 2017

(54) SYSTEM AND METHOD FOR EVALUATING READING FLUENCY USING UNDERLINING

(71) Applicant: Max M. Louwerse, Ulvenhout (NL)

(72) Inventor: Max M. Louwerse, Ulvenhout (NL)

( * ) Notice: Subject to any disclaimer, the term of this patent is extended or adjusted under 35 U.S.C. 154(b) by 45 days.

(21) Appl. No.: 14/016,119

(22) Filed: Sep. 1, 2013

(65) Prior Publication Data

US 2014/0065581 A1    Mar. 6, 2014

Related U.S. Application Data

(60) Provisional application No. 61/695,379, filed on Aug. 31, 2012.

(51) Int. Cl.
*G09B 5/00*    (2006.01)
*G09B 17/00*   (2006.01)

(52) U.S. Cl.
CPC .................. *G09B 17/003* (2013.01)

(58) Field of Classification Search
USPC .......... 434/156, 157, 167, 169, 178
See application file for complete search history.

(56) References Cited

U.S. PATENT DOCUMENTS 8,226,416 B2 * 7/2012 Abrash et al. ................ 434/185
2009/0239202 A1 * 9/2009 Stone ...................... G09B 5/00
                                                    434/178

* cited by examiner

*Primary Examiner* — Kesha Frisby
(74) *Attorney, Agent, or Firm* — Wayne Edward Ramage; Baker Donelson

(57) ABSTRACT

A system of evaluating reading fluency by monitoring the underlining of text as it is being read on a tablet or other computing device. The text or passage is presented on the screen of the tablet computing device with a touchscreen, such as, but not limited to, an iPad. The reader uses a stylus, finger, or other device to underline each word as it is read, and may go back and re-underline any words to regress within the passage. Alternatively, a mouse can be used to indicate words as they are read. Computer software tracks the reader's underlining, providing detailed information about reading rate, pauses, regressions, and other word and word combination features.

12 Claims, 3 Drawing Sheets

SYSTEM AND METHOD FOR EVALUATING READING FLUENCY USING UNDERLINING

This application claims benefit of and priority to U.S. Provisional Application No. 61/695,379, filed Aug. 31, 2012, by Max Louwerse, and is entitled to that filing date for priority. The specification, figures and complete disclosure of U.S. Provisional Application No. 61/695,379 are incorporated herein by specific reference for all purposes.

FIELD OF INVENTION

This invention relates to a system and method for evaluating and assessing reading fluency using underlining.

BACKGROUND OF THE INVENTION

Monitoring where people look when reading a text and for how long can be done with various techniques that have been developed in the cognitive sciences (psychology, linguistics, and education). These techniques are self-paced reading methods and are based on the assumption that a participant will read at a rate matching the comprehension process. They are extremely useful in detecting when readers experience problems in a text, and how and how fast readers read the text. For instance, in moving windows paradigms readers press a button and a word appears on the screen. Even though this technique has been frequently used to measure reading processes, it does not allow for identifying reading difficulties beyond the word level and it requires a rather unnatural reading process. Other techniques, such as eye tracking, do allow for identifying reading difficulties at and beyond the word level, and are more natural. However, they require careful calibration, and do not allow for monitoring multiple readers over longer stretches of time, such as reading fluency and proficiency in classrooms.

Accordingly, what is needed is a more effective and efficient method of evaluating and assessing reading fluency that is natural, precise, and allows for monitoring multiple readers (e.g., a classroom or teaching environment).

SUMMARY OF THE INVENTION

In various embodiments, the present invention comprises a system of evaluating reading fluency by monitoring the underlining of text as it is being read on a tablet or other computing device. In one embodiment, the text or passage is presented on the screen of the tablet computing device with a touchscreen, such as, but not limited to, an iPad, which may be folded down flat to resemble a piece of paper. The reader uses a stylus, finger, or other device to underline each word as they read it, and go back and re-underline any words to which the reader regresses within the passage. Computer software tracks the reader's (or readers') underlining, providing detailed information about reading rate, pauses, regressions, and other word and word combination features.

The system has the significant advantage of being able to be used with multiple participants at one time without the need for an individual monitor for each reader, or special equipment (e.g., no helmet or special computer screen). It also provides a testing reading rate that is more similar to natural silent reading than moving windows methods, while providing more information than paper-and-pencil assessments. The system can monitor reading time at the word level, and records the reading time at any desired accuracy level (e.g., milliseconds). The reading behavior can thus be monitored precisely, with no intrusive measures or monitor involvement.

In an alternative embodiment, the user may use another form of computer input device, such as a mouse, to "underline" or indicate words in the text as they are being read.

The present invention thereby allows the collection of reading behavior data over time, per user, per grade, per school, per area, or combinations thereof. This enables instructors to intervene at appropriate times for a student experiencing reading difficulties. It not only provides information for teachers and schools, it also provides data for cognitive psychologists, school psychologists, publishing houses, and the like.

DETAILED DESCRIPTION OF EXEMPLARY EMBODIMENTS

Figure 1:
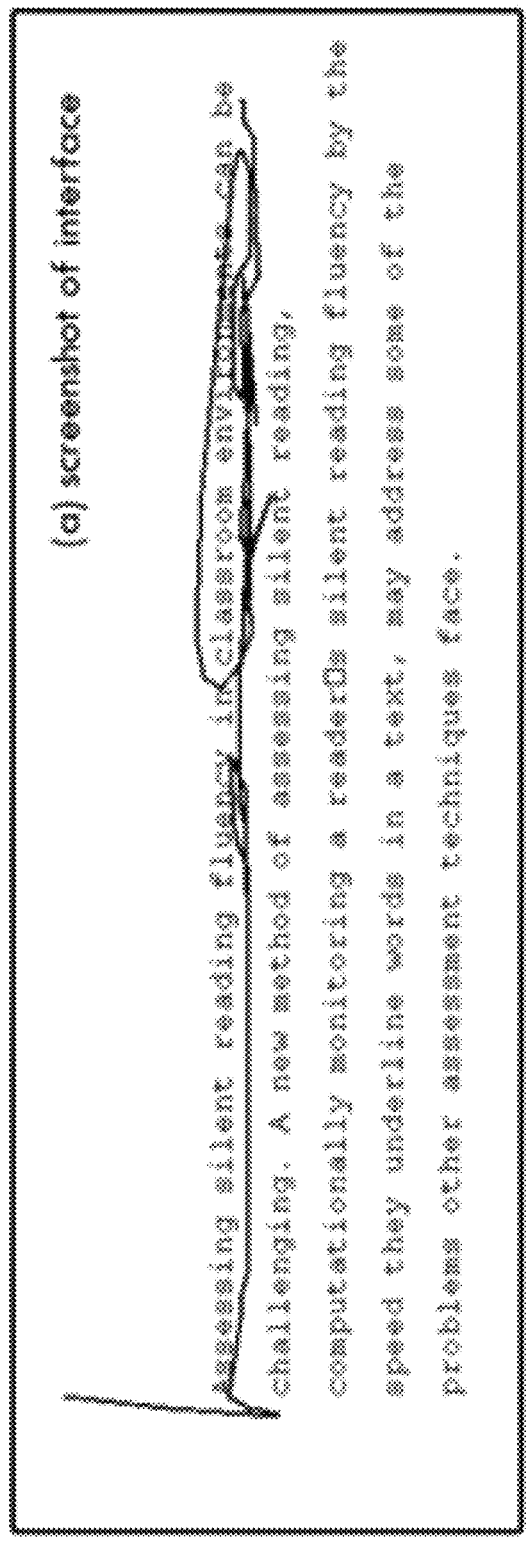
FIG. 1 shows a view of an interface of a system in accordance with an embodiment of the present invention.
Figure 3:
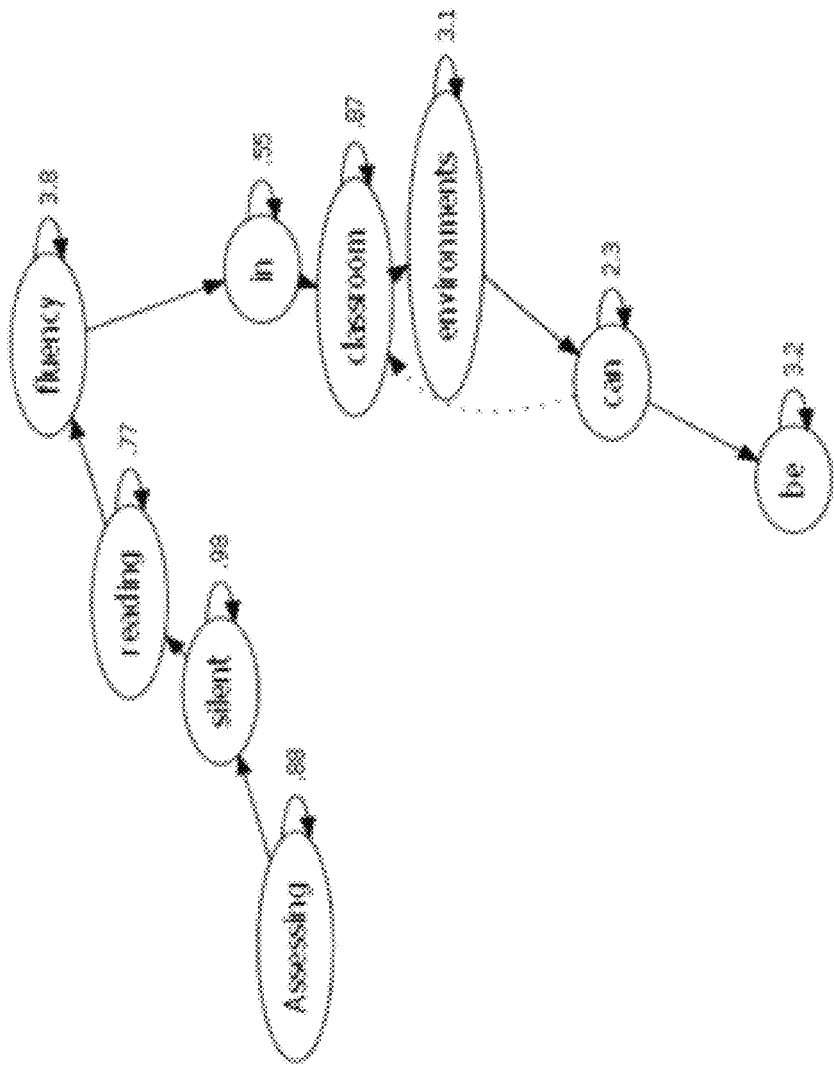
FIG. 3 shows an example of a derived word pattern with numbers representing word reading times in seconds and dotted links representing regressions.

In various embodiments, the present invention comprises a system of evaluating reading fluency by monitoring the underlining of text as it is being read on a tablet or other computing device. In one embodiment, as seen in FIG. 1, the text or passage is presented on the screen of the tablet or computing device with a touchscreen, such as, but not limited to, an iPad, which may be folded down flat to resemble a piece of paper. The reader uses a stylus, finger, or other device to underline each word as they read it, and go back and re-underline any words to which the reader regresses within the passage. Computer software tracks the reader's (or readers') underlining, providing detailed information about reading rate, pauses, regressions, and other word and word combination features. An example of a chart showing word reading times and regressions is seen in FIG. 3.

The system has the significant advantage of being able to be used with multiple participants at one time without the need for an individual monitor for each reader, or special equipment (e.g., no helmet or special computer screen). It also provides a testing reading rate that is more similar to natural silent reading than moving windows methods, while providing more information than paper-and-pencil assessments. The system can monitor reading time at the word level, and records the reading time at any desired accuracy level (e.g., milliseconds). The reading behavior can thus be monitored precisely, with no intrusive measures or monitor involvement.

Figure 2:
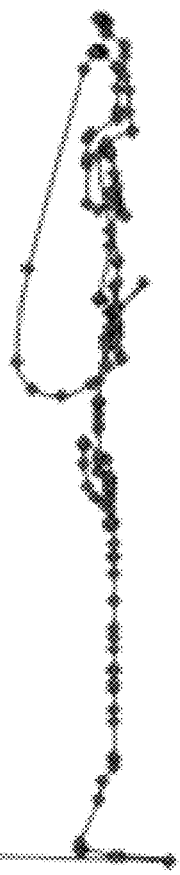
FIG. 2 shows how stylus positions are aligned with word boundaries in accordance with an embodiment of the present invention.

In an alternative embodiment, as seen in FIG. 2, the user may use another form of computer input device, such as a mouse, to "underline" or indicate words in the text as they are being read. The computer program tracks the location of the mouse pointer on the screen, and considers a word as being indicated or "underlined" if the mouse pointer falls within a box or boundary established around each word in the text, as shown.

The present invention thereby allows the collection of reading behavior data over time, per user, per grade, per school, per area, or combinations thereof. This enables instructors to intervene at appropriate times for a student experiencing reading difficulties. It not only provides information for teachers and schools, it also provides data for cognitive psychologists, school psychologists, publishing houses, and the like.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, Perl and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices as described above. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A machine for evaluating reading fluency, comprising:
a stylus; and
a processor or microprocessor coupled to a display screen, wherein the processor or microprocessor is programmed to evaluate reading fluency by:
presenting a text with a plurality of words on the display screen to a user to read;
receiving physical input from a stylus used by the user indicating when the user is looking at a particular word while silently reading a sequence of words from the text; and
recording the sequence of words looked at, the period of time each word in the sequence is looked at, and the number of times each word in the sequence is looked at.

2. The machine of claim 1, wherein the display screen is a touchscreen, and machine receives input from the user by the user underlining or touching each word on the touchscreen with the stylus as the user looks at that word.

3. The machine of claim 1, where the machine receives input from the user by the user moving a pointer on the screen to point to each word as the user looks at that word.

4. The machine of claim 1, wherein the processor or microprocessor is further programmed to perform the step of analyzing the reading rate, pauses, and regressions for the user reading the text.

5. A non-transitory computer-readable storage medium with an executable program stored thereon, wherein the program instructs a process or microprocessor to perform the following steps:
presenting a text with a plurality of words on a display screen to a user to read;
receiving physical input from a stylus used by the user indicating when the user is looking at a particular word while silently reading a sequence of words from the text; and
recording the sequence of words looked at, the period of time each word in the sequence is looked at, and the number of times each word in the sequence is looked at.

6. The medium of claim 5, wherein the display screen is a touchscreen, and the program receives input from the user by the user underlining or touching each word on the touchscreen with the stylus as the user looks at that word.

7. The medium of claim 5, where the program receives input from the user by the user moving a pointer on the screen to point to each word as the user looks at that word.

8. The medium of claim 5, wherein the processor or microprocessor further performs the step of analyzing the reading rate, pauses, and regressions for the user reading the text.

9. A method for evaluating reading fluency, comprising:
presenting, using a processor or microprocessor coupled to a memory, a text with a plurality of words on a display screen to a user to read;
receiving physical input from a stylus used by the user indicating when the user is looking at a particular word while silently reading a sequence of words from the text; and
recording, using the processor or microprocessor, the sequence of words looked at, the period of time each word in the sequence is looked at, and the number of times each word in the sequence is looked at.

10. The method of claim 9, wherein the display screen is a touchscreen, and the processor or microprocessor receives input from the user by the user underlining or touching each word on the touchscreen with the stylus as the user looks at that word.

11. The method of claim 9, where the processor or microprocessor receives input from the user by the user moving a pointer on the screen to point to each word as the user looks at that word.

12. The method of claim 9, further comprising the step of analyzing the reading rate, pauses, and regressions for the user reading the text.

* * * * *